(12) United States Patent
Del Pero et al.

(10) Patent No.: US 12,392,628 B2
(45) Date of Patent: Aug. 19, 2025

(54) LOCALIZATION BASED ON MULTI-COLLECT FUSION

(71) Applicant: Lyft, Inc., San Francisco, CA (US)

(72) Inventors: Luca Del Pero, London (GB); Karim Tarek Mahmoud Elsayed Ahmed Shaban, London (GB)

(73) Assignee: Lyft, Inc., San Francisco, CA (US)

( * ) Notice: Subject to any disclaimer, the term of this patent is extended or adjusted under 35 U.S.C. 154(b) by 739 days.

(21) Appl. No.: 16/917,803

(22) Filed: Jun. 30, 2020

(65) Prior Publication Data

US 2021/0404834 A1 Dec. 30, 2021

(51) Int. Cl.
  *G01C 21/36* (2006.01)
  *G01C 21/32* (2006.01)
  *G06F 16/29* (2019.01)
  *G06V 20/56* (2022.01)

(52) U.S. Cl.
  CPC ......... *G01C 21/3635* (2013.01); *G01C 21/32* (2013.01); *G01C 21/3614* (2013.01); *G06F 16/29* (2019.01); *G06V 20/56* (2022.01)

(58) Field of Classification Search
  CPC ............... G01C 21/3635; G01C 21/32; G01C 21/3614; G06F 16/29; G06V 20/56
  See application file for complete search history.

(56) References Cited

U.S. PATENT DOCUMENTS

| | | | |
|---|---|---|---|
| 2006/0221072 A1 | 10/2006 | Se et al. | |
| 2015/0109338 A1* | 4/2015 | Mckinnon | G06F 16/50 345/633 |
| 2016/0189381 A1 | 6/2016 | Rhoads | |
| 2017/0357858 A1* | 12/2017 | Mendonca | G01C 21/3859 |
| 2018/0188026 A1 | 7/2018 | Zhang et al. | |
| 2018/0283882 A1* | 10/2018 | He | H04L 67/30 |
| 2018/0336697 A1* | 11/2018 | Lu | G06T 7/73 |
| 2019/0066330 A1* | 2/2019 | Luo | G01C 21/20 |
| 2020/0098135 A1* | 3/2020 | Ganjineh | G06V 20/588 |
| 2020/0200545 A1* | 6/2020 | Wappler | G06F 18/214 |
| 2020/0372285 A1* | 11/2020 | Adams | G06N 3/084 |
| 2021/0172757 A1 | 6/2021 | Chen et al. | |
| 2022/0099455 A1* | 3/2022 | Jin | G06V 20/46 |
| 2022/0172484 A1* | 6/2022 | Yonekawa | G06N 3/02 |
| 2022/0284609 A1 | 9/2022 | Shree et al. | |
| 2022/0373337 A1 | 11/2022 | Zeng et al. | |
| 2023/0069018 A1* | 3/2023 | Shiroshima | G01B 11/00 |

* cited by examiner

*Primary Examiner* — Erin M Piateski
*Assistant Examiner* — Gabriel Joseph Rene Lambert
(74) *Attorney, Agent, or Firm* — Lee Sullivan Shea & Smith LLP

(57) ABSTRACT

Examples disclosed herein may involve a computing system that is operable to (i) generate a local map portion of a geographical environment based on sensor data captured by a device, wherein the local map portion comprises local map structure data generated using one or more map structure generation methods, (ii) determine a transformation of the local map structure data relative to existing map structure data of an existing map based on common visible features between the local map structure data and the existing map structure data, wherein the existing map structure data is aligned to a global coordinate system and is predetermined from a plurality of previously-generated map structure data, and (iii) determine a localization of the device within the global coordinate system using the determined transformation.

20 Claims, 13 Drawing Sheets

LOCALIZATION BASED ON MULTI-COLLECT FUSION

FIELD OF THE INVENTION

The present disclosure relates to a method of generating a three-dimensional (3D) map. More particularly, the present disclosure relates to a method of generating a 3D map by fusing the structure data of overlapping independent map portions.

BACKGROUND

For the purposes of real-world map generation, various may generation techniques and combinations of map generation modules can be employed. In order to create a robust map of high visual quality, vehicles may be equipped with sensors such as cameras and/or Light Detection and Ranging (LiDAR) sensors, among other possibilities. In some cases, these vehicles may be attached with multiple cameras, where each such camera is orientated differently in order for the multiple cameras to work together to capture a 360-degree, or a substantially unobstructed, view of the environmental surroundings.

As one possible implementation, maps can be created from image data obtained by the vehicles using techniques such as visual odometry or Structure-from-Motion (SfM) that reproduce structural features of the observed environment from image data. Traditional SfM solves a large joint optimization problem called bundle adjustment, which increases in time complexity in a cubic fashion on the number of input images and thus the re-computation using the consolidated images across collects of data results in large time complexity to perform bundle adjustment. Thus, current approaches involve a computationally slow and expensive pipeline for map generation.

Specifically, methods of map generation using SfM are operationally and technically difficult as the require high computational power and long time periods to generate a 3D map due to the re-computation of data, particularly when re-building each map portion with the consolidated data across multiple collects for each portion of the map. These methods of map generation show inefficiencies in processing data and lack scalability.

It is important for scalable, robust and efficient methods to be available to process sensor data and generate maps, such as for maps deployed in the cloud and used for visual localization as well as for other applications.

SUMMARY

In one aspect, the disclosed technology may take the form of a first method that involves (i) generating first structure data from one or more first image data, where the first structure data comprises one or more visible features captured in the one or more first image data, (ii) generating further structure data from one or more further image data, where the further structure data comprises one or more visible features captured in the one or more further image data, (iii) determining pose constraints for the further structure data based on common visible features, (iv) determining a transformation of the further structure data relative to the first structure data using the determined pose constraints, and (v) generating combined structure data using the determined transformation to fuse the further structure data and the first structure data.

In example embodiments of the first method, determining the transformation of the further structure data relative to the first structure data may comprise (a) overlapping each of the one or more further image data onto at least one of the one or more first image data based on common visible features of the first structure data and the further structure data, and (b) aligning each of the one or more further image data with the at least one of the one or more first image data using the common visible features of the first structure data and the further structure data.

In these example embodiments of the first method, determining the transformation of the further structure data relative to the first structure data using the determined pose constraints may comprise one or both of (a) aligning common visible features of the first structure data within the one or more first image data or (b) aligning common visible features of the further structure data within the one or more further image data.

Further, in these example embodiments of the first method, aligning each of the one or more further image data with the at least one of the one or more first image data may comprise one or more of (a) seven degrees of freedom, (b) translation, (c) rotation, (d) dilation, (e) contraction, (f) reflection, (g) scaling, or (h) shear mapping operations.

Further, in example embodiments of the first method, the combined structure data may be used as the first structure data in further iterations of generating combined structure data.

Further yet, in example embodiments of the first method, determining the transformation may comprise using the pose constraints to align pose data of the one or more further image data with pose data for the one or more first image data.

Still further, in example embodiments of the first method, the combined structure data may comprise (a) aligned structure data of the common visible features of the first structure data and the further structure data, and (b) at least some structure data from the first structure data and the further structure data.

In other example embodiments of the first method, the one or more visible features captured in the first image data and the second image data may comprise one or more of (a) a landmark, (b) a building, (c) a street furniture, (d) a pedestrian sidewalk, (e) a curb, or (f) a corner or an edge of a visible structure.

In further example embodiments of the first method, determining the transformation of the further structure data relative to the first structure data may comprise (a) comparing each image of the one or more further image data to each image of the first image data, and (b) determining a matching pair of images based on the common visible features of the first structure data and the further structure data, where the matching pair of images may comprise one image from the first image data and one image from the further image data.

In these example embodiments of the first method, determining the matching pair of images may comprise determining the matching pair of images using one or both of a visual feature matching technique or an edge detection technique.

In still further example embodiments of the first method, determining the transformation of the further structure data relative to the first structure data may comprise (a) detecting one or more two-dimensional visible features in each image of the one or more first image data and the one or more further image data, and (b) determining common two-dimensional visible features between one or more of (1) the one or more first image data, (2) the one or more further image data, or (3) one or more first image data and the one or more further image data.

In these example embodiments of the first method, determining the transformation of the further structure data relative to the first structure data further may comprise generating common three-dimensional features using the determined common two-dimensional visible features.

Further, in these example embodiments of the first method, determining the transformation of the further structure data relative to the first structure data further may comprise aligning the common three-dimensional features.

In additional example embodiments of the first method, a map structure generation method may be used to generate either of (a) the first structure data or (b) the further structure data.

In these example embodiments of the first method, the map structure generation method may comprise structure from motion techniques.

In even further example embodiments of the first method, the one or more further image data may be determined from images having at least a predetermined threshold of common visible features between the one or more first image data and the one or more further image data.

In still further example embodiments of the first method, one or both of (a) the one or more first image data or (b) the one or more further image data may comprise images captured using one or more image sensors.

Moreover, in example embodiments, the first method may further involve updating a global map with the generated combined structure data.

In another aspect, the disclosed technology may take the form of a second method that involves (i) generating a local map portion of a geographical environment based on sensor data captured by a device, where the local map portion comprises local map structure data generated using one or more map structure generation methods, (ii) determining a transformation of the local map structure data relative to existing map structure data of an existing map based on common visible features between the local map structure data and the existing map structure data, where the existing map structure data is aligned to a global coordinate system and is predetermined from a plurality of previously-generated map structure data, and (iii) determining a localization of the device within the global coordinate system using the determined transformation.

In example embodiments of the second method, determining the transformation of the local map structure data may comprise (a) overlapping the local map structure data onto the existing map structure data of the existing map based on common features of the local map structure data and the existing map structure data, and (b) aligning the local map structure data with the existing map structure data of the existing map using the common features of the of the local map structure data and the existing map structure data.

In these example embodiments of the second method, aligning the local map structure data may comprise manipulating the local map structure data by one or more of (a) seven degrees of freedom, (b) rotation, (c) dilation, (d) contraction (e) reflection, (f) scaling, or (g) shear mapping operations.

Further, in example embodiments of the second method, the local map portion and the existing map may each be generated using a respective set of one or more sequential images of the geographical environment.

In these example embodiments of the second method, determining the transformation of the local map structure data may comprise (a) comparing each sequential image in the respective set of one or more sequential images used to generate the local map portion to each sequential image in the respective set of one or more sequential images used to generate the existing map, and (b) determining a matching pair of images based on common visible features of the local map portion and a corresponding existing map portion, where the matching pair of images comprises one image from the local map portion and one image from the existing map.

Further, in these example embodiments of the second method, determining the matching pair of images may comprise determining the matching pair of images using one or more of a visual feature matching technique or an edge detection technique.

Further yet, in these example embodiments of the second method, determining the transformation of the local map structure data may comprise (a) detecting one or more two-dimensional visible features in each of the sequential images used to generate the local map portion and each of the sequential images used to generate the existing map, (b) determining common two-dimensional visible features between one or more of (1) the respective set of one or more sequential images used to generate the local map portion or (2) the respective set of one or more sequential images used to generate the existing map and both respective sets of one or more sequential images used to generate the local map portion and the existing map, and (c) generating common three-dimensional visible features using the determined common two-dimensional features.

Still further, in these example embodiments of the second method, the one or more map structure generation methods may involve determining a pose for each sequential image in the respective set of one or more sequential images used to generate the local map portion.

Even further, in these example embodiments of the second method, determining the localization of the device within the global coordinate system may comprise performing a pose comparison between the local map portion and the existing map.

In other example embodiments of the second method, the one or more common visible features may comprise one or more of (a) a landmark, (b) a building, (c) a street furniture, (d) a pedestrian sidewalk, (e) a curb, or (f) a corner or an edge of a visible structure.

In further example embodiments of the second method, determining the transformation of the local map structure data further may comprise generating one or more pose constraints for the local map structure and updating the existing map with the local map portion using the one or more pose constraints.

In additional example embodiments of the second method, the one or more map structure generation methods may comprise structure from motion techniques.

Moreover, in example embodiments, the second method may further involve performing an initial localization within the global coordinate system to identify the existing map structure data of the existing map, where the initial localization may comprise using satellite navigation.

In a yet another aspect, the disclosed technology may take the form of a computing system comprising at least one processor, a non-transitory computer-readable medium, and program instructions stored on the non-transitory computer-readable medium that are executable by the at least one processor such that the computing system is configured to carry out one or more functions of one or more of the aforementioned methods.

In a further aspect, the disclosed technology may take the form of a non-transitory computer-readable medium comprising program instructions stored thereon that are executable to cause a computing system to carry out one or more functions of one or more of the aforementioned methods.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which.

Figure 1A:
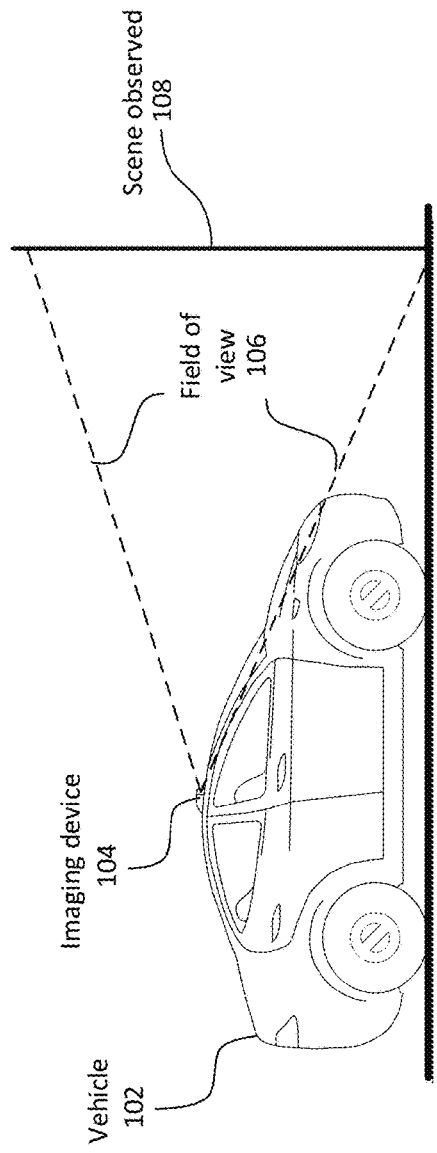
FIGS. 1a and 1b illustrate an example vehicle that can capture image data as it traverses an environment, showing the image field of view and two sequential collects of new mapping data over two respective vehicle trajectories.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

For real-world map generation, various map generation techniques and combinations of map generation modules can be employed. Three-dimensional (3D) visual maps that are suitable for the comprehensive understanding of mapped environments can be built using data captured by vehicles equipped with imaging devices (e.g., camera(s)) and/or other sensors that are capable of capturing images of and/or other data about geographical areas.

Example embodiments described herein provide a more efficient and robust map generation method compared to conventional methods by generating a plurality of structure data or local maps, which can be generated in parallel or substantially simultaneously, that are fused together and combined using structure data and other mapping properties to create a global map. Referring to FIGS. 1 to 11, example embodiments of a method of map generation will now be described.

Figure 1B:
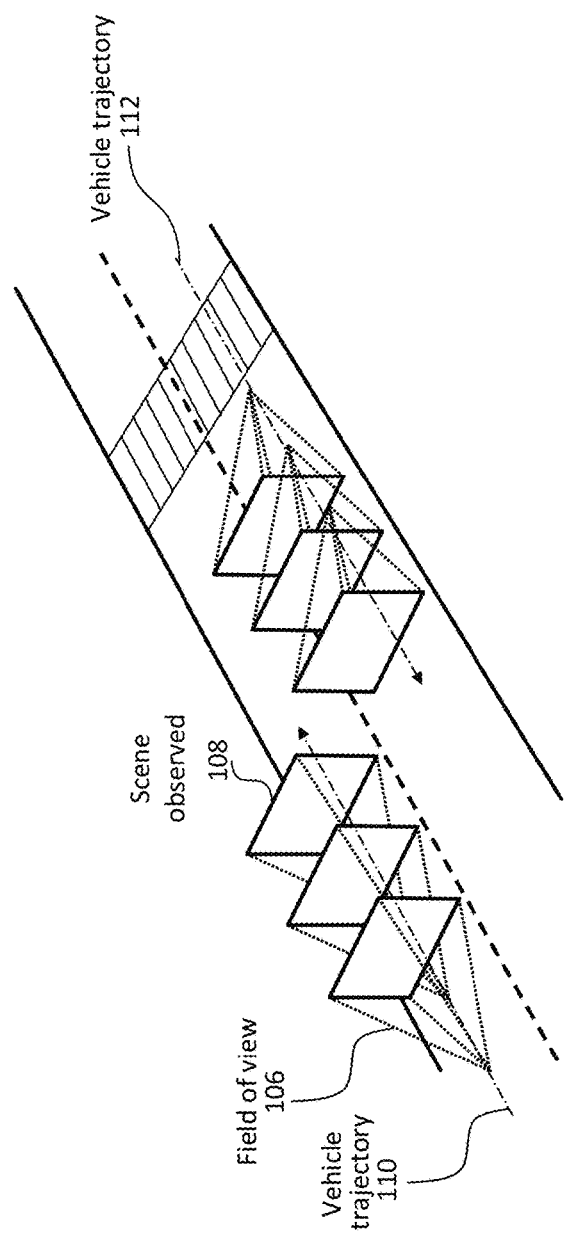

FIGS. 1a and 1b show a visual mapping overview illustrating two perspective views, a side view and an angled view, of how vehicles, such as an example vehicle 102 shown in FIG. 1a, can be used to obtain visual data (e.g., image data) for 3D map generation. A 3D global map generated from visual data can for example include datasets of image poses and structural data derived from sensor data.

FIG. 1a illustrates that the vehicle 102 has an associated imaging device 104 that is capable of obtaining image data for map generation. In example embodiments, the field of view of the imaging device 104, otherwise known as the angle of view, can vary depending on the placement of the imaging device 104 on or in the vehicle 102. As shown in FIG. 1a, the imaging device 104 may be attached to the vehicle 102 externally, such as on the roof of the vehicle, at an appropriate height above the ground to capture scenes observed 108 containing fewer obstacles obscuring any visual information such as structures, landmarks or road markings. Although the imaging device 104 is positioned on top of the vehicle 102 in FIG. 1a, the imaging device 104 (or multiple imaging devices) may alternatively be placed inside the vehicle 102 or mounted elsewhere on the vehicle on any suitable locations in or on the vehicle. Example locations for sensors may include the front and rear bumpers, the doors, the front windshield, on the side panel, or any other suitable location. Each vehicle 102 can be provided with multiple imaging devices 104 attached to it where each imaging device 104 is orientated differently, such that the multiple cameras work together to capture a 360-degree view of the surroundings.

The imaging device 104 may comprise any of various types of sensors can be used to capture image data. For example, with the use of camera rigs such methods can obtain 360-degree coverage of geographical areas and can also result in accurate and robust quality map generation, although an expensive system being required for data collection and the time required to process the data gathered may limit scalability. In some embodiments, there may be implemented single-viewpoint or limited field of view (intended to be understood as having a field of view of less than 360-degrees in one plane) cameras such as those in a typical "smartphone," i.e. a mobile telephony device equipped with image sensors, or any other data-enabled mobile device with a limited field of view image sensor, to obtain image data for map generation can reduce costs of visual mapping of the real world with the use of off the shelf hardware that is relatively readily available. As these devices are plentiful, cheap to procure and easy to deploy, they can provide a scalable aspect of a map generation system or pipeline. Alternatively, however, the imaging device may be any form of limited field of view image sensor capable of capturing and communicating image data to a map generation system for the image data to be processed.

FIG. 1b depicts a perspective view of two separate sequences of images (or "collects") over two different example vehicle trajectories 110, 112. The scenes observed 108 may be captured using imaging devices capturing a two-dimensional (2D) view from which it is possible to re-construct 3D views from the sequence of captured images for 3D map generation. In example embodiments, a field of view 106 and the scene observed 108 can be associated with a pose of the imaging device 104 at the points of each image capture of the scene 108. More particularly, the scene observed 108 can be associated with the image captured and the direction or orientation of the imaging device.

Figure 2:
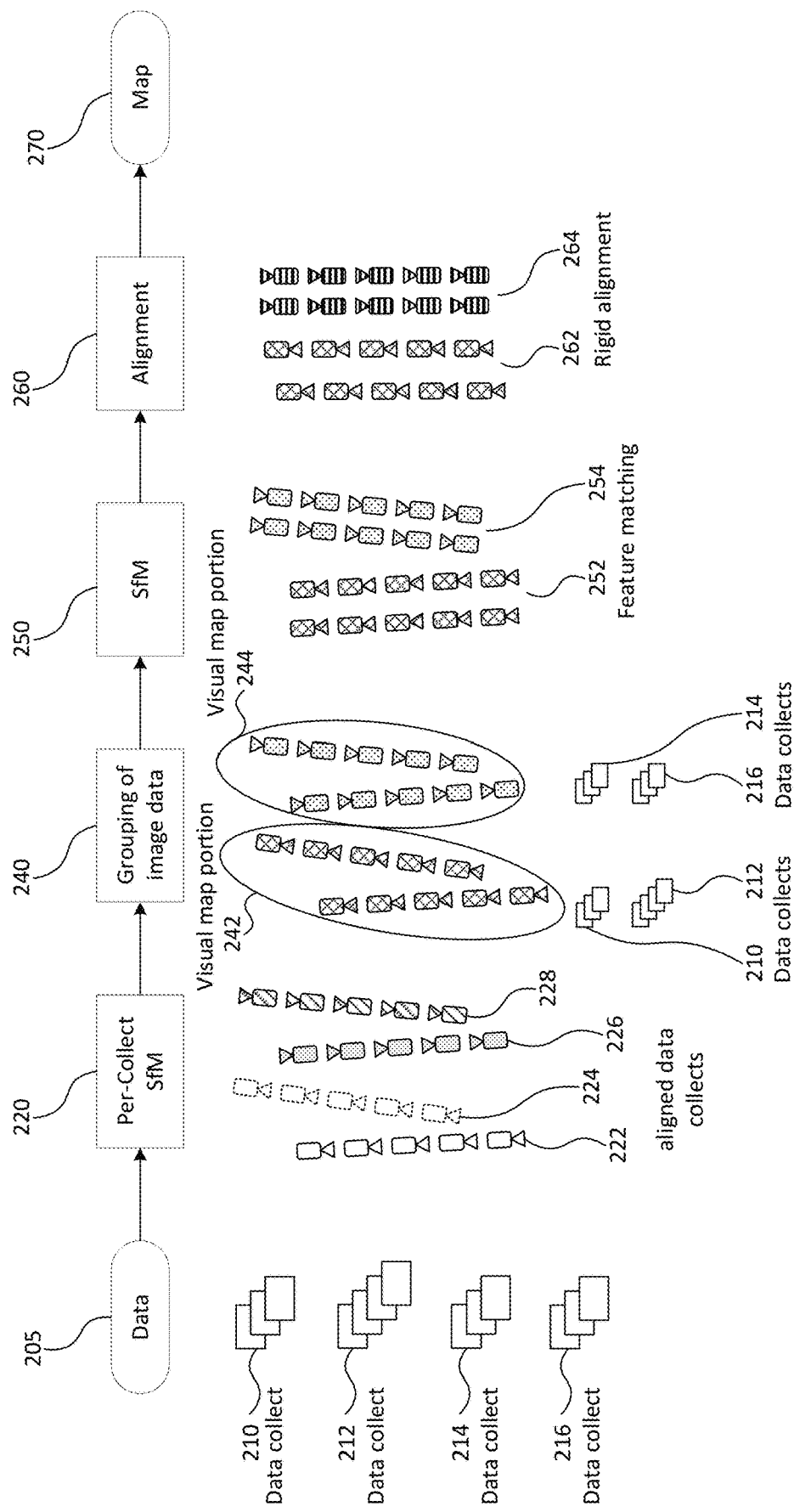
FIG. 2 illustrates a known pipeline for generating visual map data from image data which uses structure from motion.

FIG. 2 shows one possible pipeline that can be used to generate map data. This figure illustrates the various stages of the pipeline of map generation. For map generation, sequential image datasets 205, which may take the form of data collects (or data streams or data passes) 210, 212, 214, 216, can be obtained by imaging devices (attached internally or externally to vehicles for example) that are capable of gathering limited field of view images as they navigate across geographical areas. The dataset 205 of data collects 210, 212, 214, 216 are processed by a photogrammetric imaging technique, such as per-collect Structure-from-Motion (SfM) 220, which can be used to generate sequential pose data of the processed data collects 210, 212, 214, 216. In FIG. 2, per-collect SfM 220 is implemented to reconstruct poses of the data collects 210, 212, 214, 216 and obtain a sequential map. Photogrammetry is known in the art as the extraction of measurements from image data. Thus, in some embodiments, the output of the per-collect SfM may further include, however it is not limited to, measurements or 3D models of real-world landmarks or structures as identified in the images of the data collects 210, 212, 214, 216. Per-collect SfM 220 is implemented on each of the data collects 210, 212, 214, 216 in order to recover pose information of each of the individual image frames that collectively from the data collects 210, 212, 214, 216 and thereby generate aligned data collects 222, 224, 226, 228. This in itself, however, may not create a fully generated or robust map due to misalignments of structural data across data collects 210, 212, 214, 216 in the sequential map, which can be present.

Figure 3:
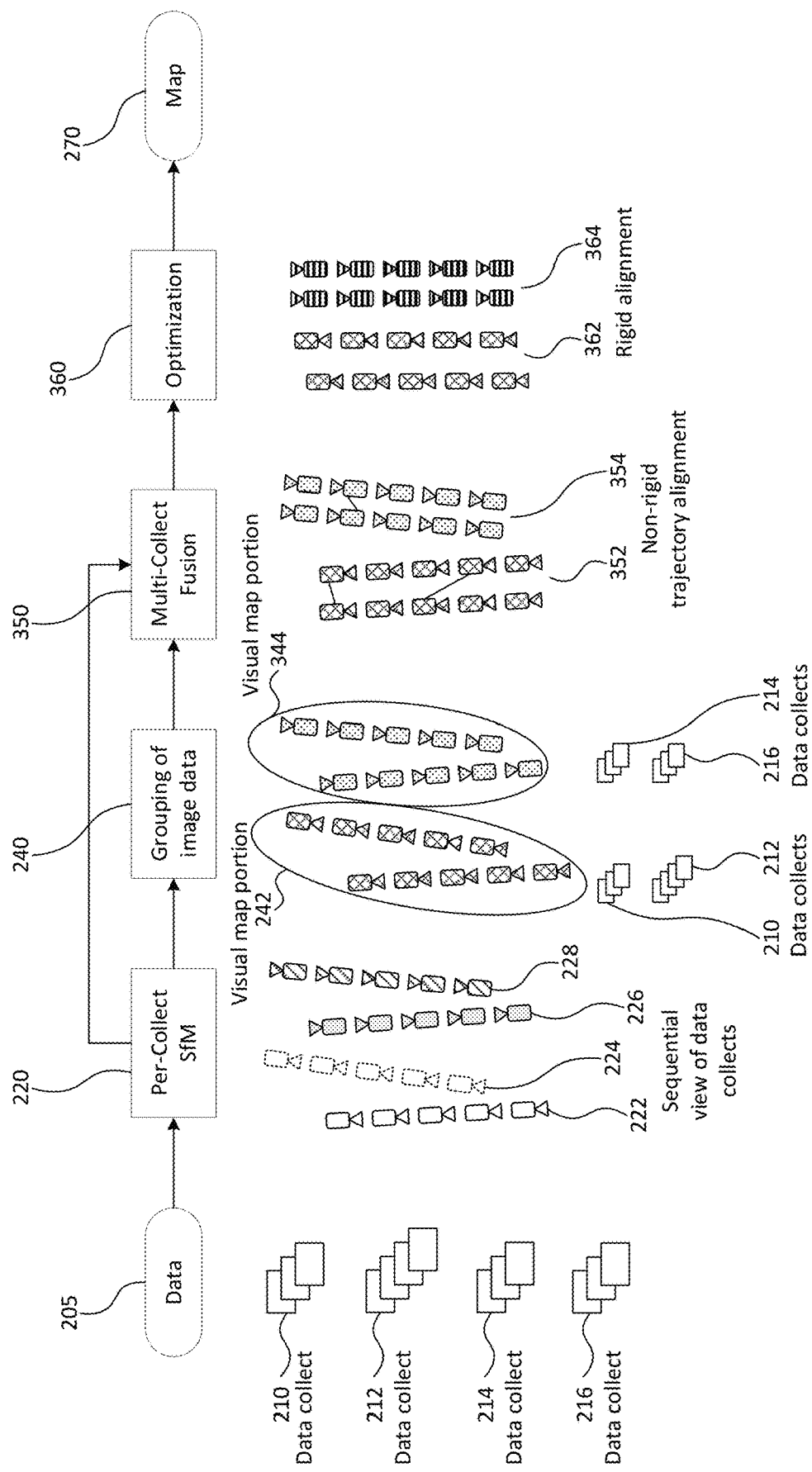
FIG. 3 shows a pipeline illustrating various stages of the example embodiment, notably with the incorporation of a multi-pass fusion module.

In example embodiments, multiple trajectories of vehicles capturing image data can be used to create a complex source of map generation data. As shown in FIGS. 2 and 3, the pipeline of map generation can comprise a module 240 suitable for grouping image data or data collects. Optionally, the module for grouping data 240 can have prior knowledge of the world, such as the knowledge of road names or landmarks etc. in order to usefully guide the alignment or grouping process of visual map portions 242, 244. Thus, sufficiently large amounts of image data captured over multiple trajectories may be required in order to extract context for geographical areas of the real-world. An example grouping technique that may be used to sort and group data collects 222, 224, 226, 228 aligned by SfM and thereby generate visual map portions 242, 244, otherwise known as grouped map portions or grouped collects, comprising structure data and other map data. Derived map data and specifically the structure data of the visual map portions 242, 244 can then be compiled, combined, and transformed to create the 3D map 270 of the real-world.

Image data captured using vehicles, particularly ground vehicles, can generate a robust and scalable map from visual map portions 242, 244, that can be connected and aligned together to create a "global" 3D map 270 representing the structure of a mapped environment. Aligned data collects 222, 224, 226, 228 can be grouped by the module 240 by their position, direction, and/or visual similarity. In this way, aligned sequential image data 222, 224, 226, 228 can be grouped in terms of data located in or viewing the same scene or environment, or parts of the scene or environment, in order to connect and align with sufficient visual redundancy. Various grouping techniques 240 may be used in determining the location similarity of data collects (for example such as based on an assessment of Global Positioning System (GPS) data). In example embodiments, visual map portions 242, 244 can share subsets of data collects such that two or more visual map portions overlap with each other, which can later be used to match areas of the map together.

In the pipeline of FIG. 2, SfM 250 is then reapplied, as part of an iterative process, in order to determine the structures of substantially large datasets of visual map portions 242, 244 to determine feature matching data collects 252, 254. Thus, a drawback of the pipeline of FIG. 2 is that it carries out re-computation of all data collects by reapplying SfM. Iterative applications of SfM are computationally expensive and can require signification periods of time to perform the computation. Furthermore, in the pipeline of FIG. 2, it is necessary to further align the data collects though a rigid alignment process 260 to determine alignment of sequential data collects 262, 264.

To the address these and other issues with a map generation pipeline as the one shown in FIG. 2, disclosed herein is a map generation pipeline that is based on a multi-collect function approach. For instance, FIG. 3 illustrates an example embodiment of a pipeline 300 for generating 3D maps 270 which incorporates a multi-collect fusion module 350. The pipeline seeks to reuse pose data and structure data generated from the per-collect SfM 220 and, in some embodiments, the overlapping map structure data from grouped local data (or grouped collects) 242, 244. The multi-collect fusion module 350 transforms and fuses the visual data of the grouped data 342, 344 to create a non-rigid trajectory alignment of the map portions 352, 354 on a global coordinate system. More specifically, example embodiments provide methods of reusing prior pose information which can efficiently and robustly output a 3D map 270 without having to entirely rely on the repeated use of SfM and alignment techniques by fusing the structure data already created during per-collect SfM 220 and which structure data is provided directly to the multi-collect fusion process 350 to be iteratively fused together. The ability to reuse prior pose information can enable vast amounts of previously computed data to be transformed and fused together, forming combined structural data. Thus, the example embodiment can provide a scalable process for map generation without repeating data processing operations over large datasets to the extent of current approaches. In other words, this method enables multiple maps to be generated, in real-time, and then fused together without needing to group images or collects geographically before re-computing SfM to generated map data, as with traditional methods. To further optimize the data collects or map portions, an optimization process 360 can be performed for example to determine a rigid, or more accurate, alignment of sequential data collects 362, 364.

Figure 4:
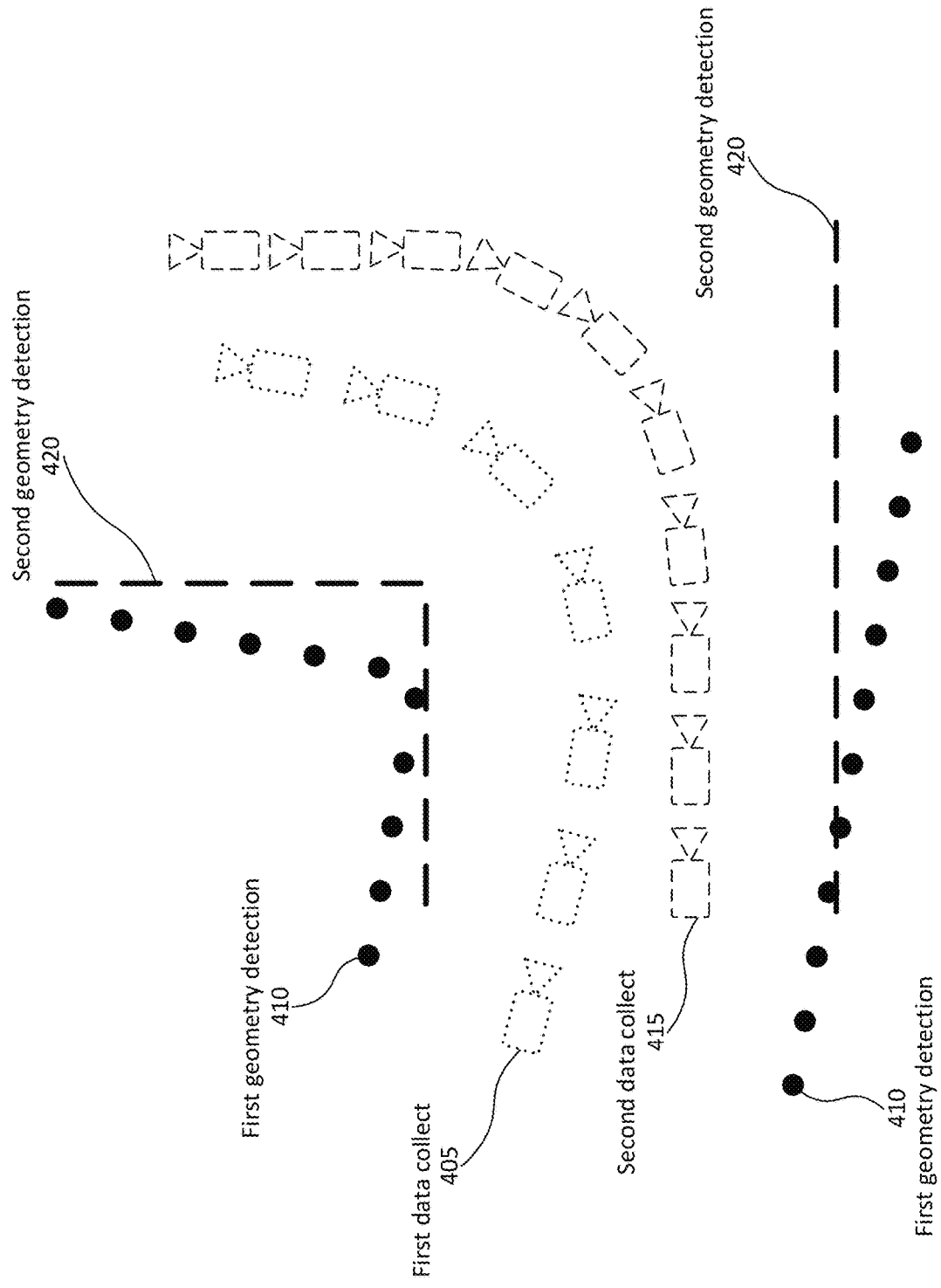
FIG. 4 illustrates two misaligned visual data collects and poses sharing the same geometric detections.

FIG. 4 shows an illustration of an example misalignment of first and second geometry detections 410 and 420 (i.e. the structure data generated by SfM as the map structure generation method from the first data collect vs the second data collect, which in this example are mis-aligned when overlaid upon each other in an overhead view) captured by the first and second data collects 405 and 415 of image data. More specifically, FIG. 4 depicts two vehicle trajectories, labelled as first and second data collects 405 and 415, both comprising of a sequence of images capturing geometric data for example extracted from SfM. FIG. 4 illustrates evidence of misalignment of the overlapping geometry detections which can be corrected by transformation techniques such as alignment or warping through the multi-collect fusion module of present embodiments described herein. In some embodiments, transformation techniques can include, translation, rotation, dilation, contraction, reflection, scaling, or shear mapping operations, any or all with seven degrees of freedom. Specifically, these techniques are used to determine a transformation to align most of the structure in a first (or "seed") piece of map structure (generated from a first set of data) with most of the structure in a second (or "further") piece of map structure (generated from a further set of data). The transformation that is determined can then be used to warp the second piece of map structure into the co-ordinate frame of the first piece of map structure in order to allow the two pieces of map structure to be fused together into a combined map structure. Further pieces of map structure can then be transformed and fused in iterations to create larger and larger combined map structures from multiple smaller map structures.

Figure 5:
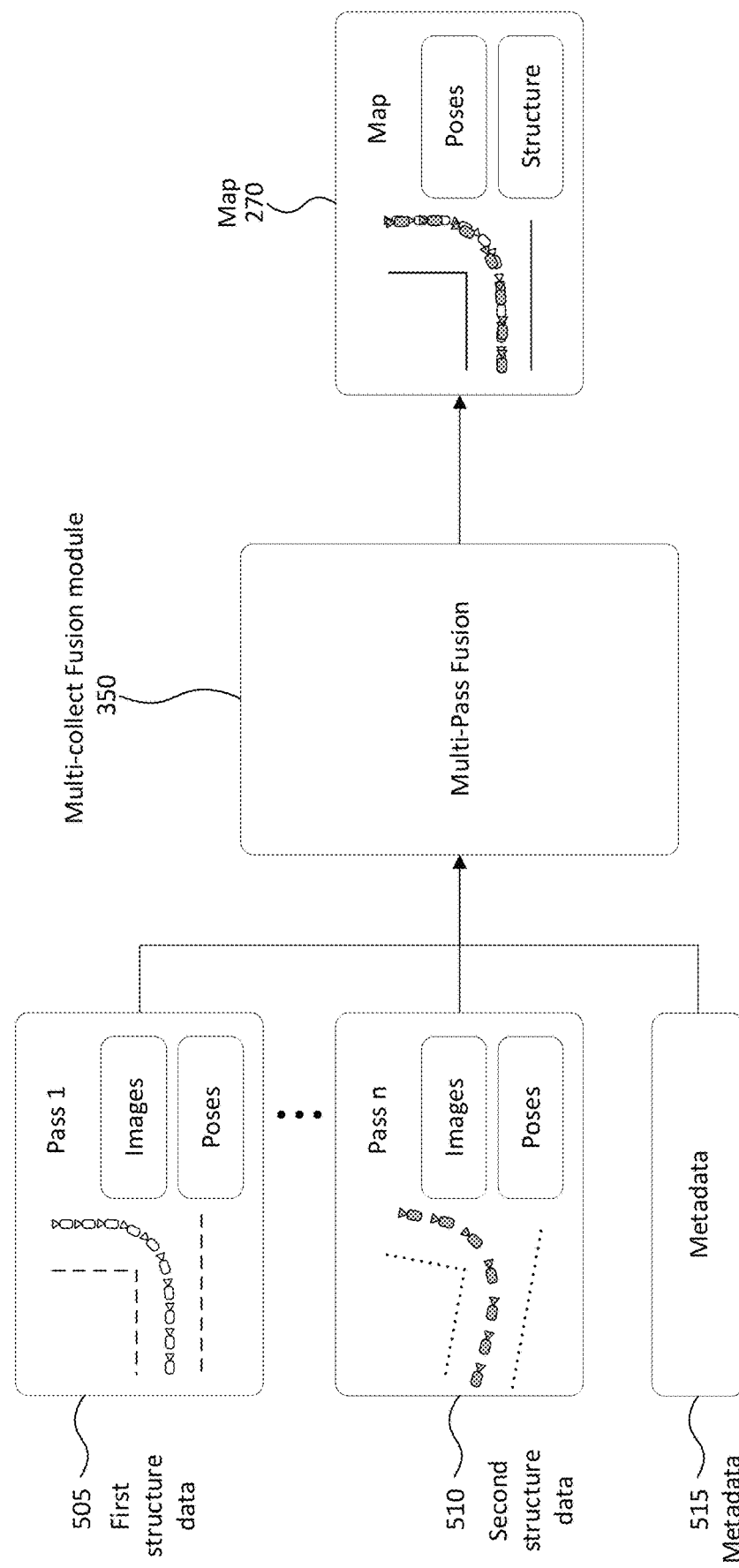
FIG. 5 illustrates a more detailed version of the inputs and outputs of the multi-collect fusion module illustrated in FIG. 1.

FIG. 5 shows a focused view of the pipeline focusing on the multi-collect fusion module 350. The inputs of the multi-collect fusion module 350 are structure data, as shown as first structure data 505, or first local map structure data, and second structure data 510, or second local map structure data, for simplicity, and other metadata 515 which may have been extracted from the process of SfM 220. In example embodiments, some or all aspects of the multi-collect fusion module may be implemented by one or more computing devices locally on the vehicles in real-time or substantially real-time. In other embodiments, some or all modules of the multi-collect fusion module may be implemented by one or more computing systems or servers, such as in the cloud. The output of the module, with or without further optimization, can be the fully rendered 3D map 270.

FIGS. 6 to 11 illustrate in detail the steps carried out by the multi-collect fusion module 350. The method in at least some embodiments seeks to identify overlapping structure data for example in the visual map portions, including visual overlaps of landmarks or other structures which are observed from a multiple viewpoint and poses.

Figure 6:
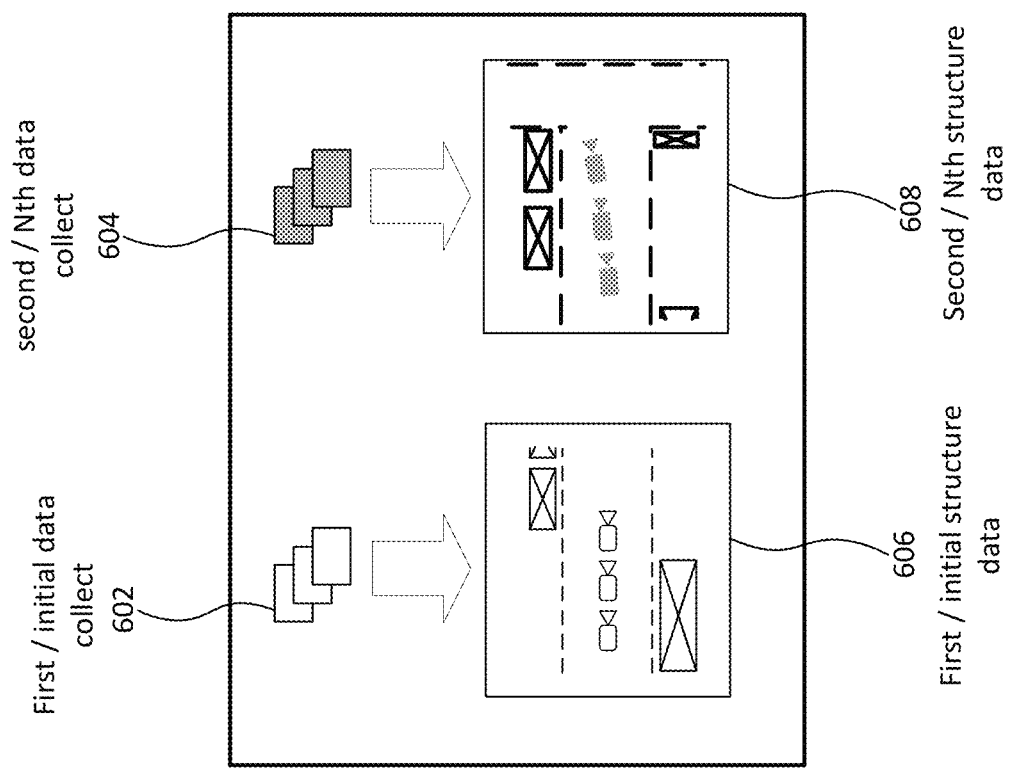
FIG. 6 illustrates a view of a geographical area captured by a first collect, known as a reference collect, and a second view of a geographical area captured by an $N^{th}$ collect.

FIG. 6 shows an illustration of a multi-pass/collect fusion transformation or alignment and warping process showing top down views of a first, or initial, and a second, or Nth, structure data 606 and 608 of overlapping geographical areas, each of the structure data otherwise known as local map structure data. Notably the two data collects, a first or initial and a second or Nth data collects 602 and 604, are obtained from different trajectories of a vehicle (or a number of vehicles) however contain heavily or substantially overlapping pose and visual data. In example embodiments, the multi-collect fusion module 350 selects the first or initial structure data 606 determined from the first data collect 602 to incrementally build upon the first structure data 606 by overlapping second or Nth structure data 608 determined from the second or Nth data collect 604 of high pose and visual similarity, although it may not be limited to such properties and other similarity properties may also be considered in this process. In example embodiments, by fixing the first structure data 606 as ground truth, the second structure data or the Nth structure data 608 can be transformed to match the geometries of the first structure data 606 for example. Thus, generating a robust 3D map which can then be further aligned and connected using subsequent structure data to generate a global 3D map is possible using the iterative process outlined above.

For illustration purposes, only single trajectories for each path are shown in the first and Nth structure data 606 and 608 as represented in FIG. 6, however, it is to be acknowledged that the same vehicle or other vehicles may traverse along the same or similar path to obtain overlapping data collects for those trajectories. In some embodiments, for vehicles obtaining image data from substantially the same location to show overlapping trajectories, there can be differences in the orientation of the images obtained and the timestamps of when each image was obtained for example, which means the scene observed by the two vehicles may differ substantially. For example, the image data may be collected having two contrasting environmental conditions. It can be preferable to collect data across a variety of times of data and weather conditions of overlapping data in order to assess visual and structural similarities across these conditions.

In example embodiments, the Nth or second structure data 608 is determined by assessing its location, directional, and/or visual similarity (based on one or more visible features) with the first structure data 606, although it is not limited to said properties. In example embodiments, all of location, directional, and visual similarities can be considered, however, in some embodiments the Nth structure data 608 may be determined based on similarities of one or more of said properties. In some embodiments, however, a method of backtracking may be used in determining the Nth structure data 608. In this way, the multi-collect fusion module 350 may assess all subsequent, second to Nth, structure data and determine the structure data with the most overlap of properties or structural data for accurate map generation.

Figure 7:
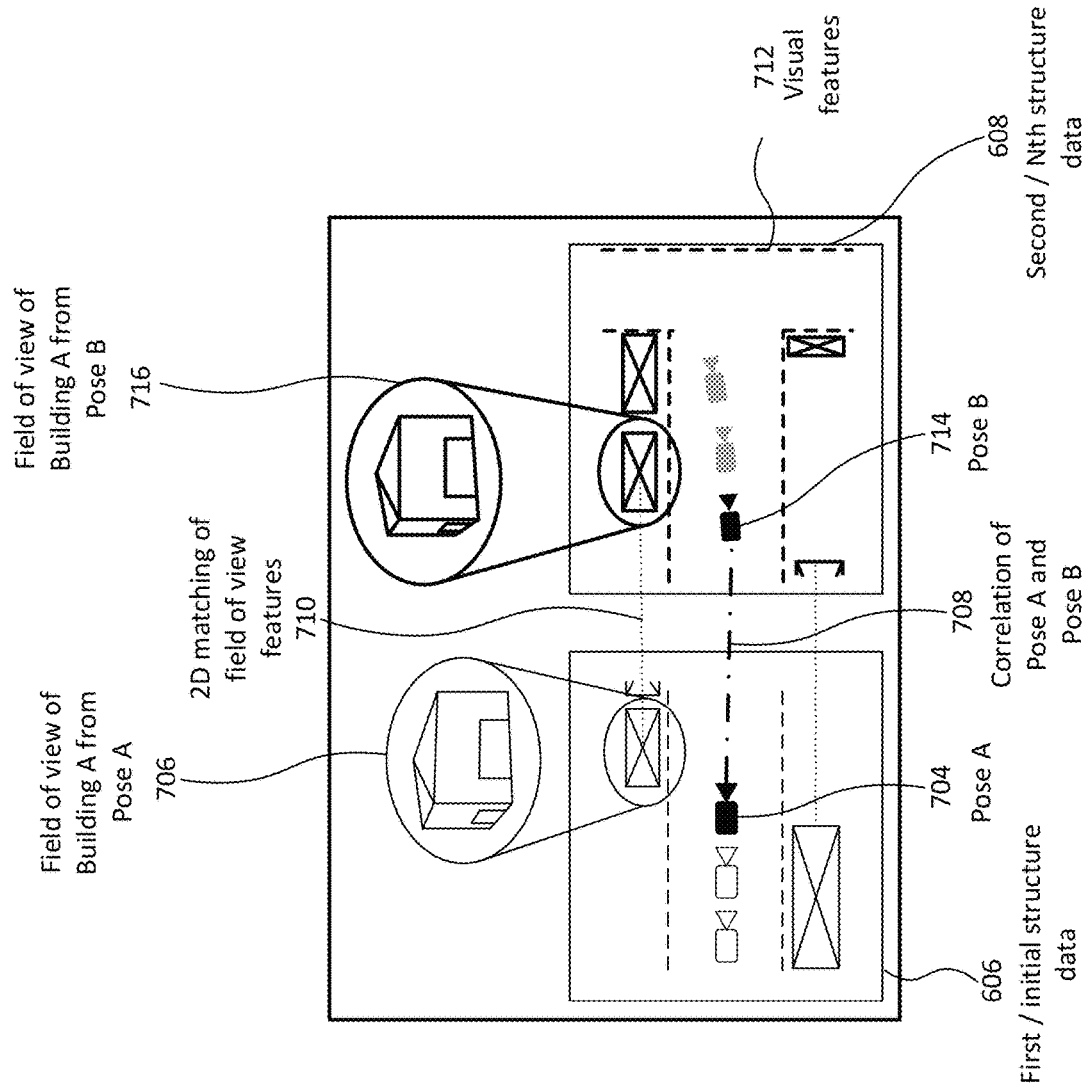
FIG. 7 illustrates the aligned poses that can be used to create a combined data structure of the first collect and the $N^{th}$ collect which includes detections from both collects.

FIG. 7 illustrates structure data correlation and matching of structural features, more specifically illustrating structure data between data collects and 2D matching of structure data. FIG. 7 illustrates Pose A 704 of the first or initial structure data 606 and Pose B 714 of the second or Nth structure data 608, further showing a correlation 708 between Pose A 704 and Pose B 714. In example embodiments, a correlation 708 between Pose A 704 and Pose B 714 based on pose and visual similarities can be determined, as well as between all poses of the first or initial structure data 606 and second or Nth structure data 608 for accurate transformation and combination of the structure data. In example embodiments, it may be preferred to maintain high pose and visual similarity for combining structure data accurately. As such, the pose data for the second or Nth structure data can be seen to be pose constraints that are based on common visible features.

In order to determine whether an overlap of poses exist, a threshold approach can be used where a threshold is set to determine the degree of location, orientation and/or visual similarity between images that is required in order to be determined as overlapping or substantially overlapping. Optionally, determining overlapping poses can involve generating a metric between different images using any one of or any combination of: neural networks that are configured to identify similarities between collected images; image descriptors; global image descriptors or local image descriptors.

More specifically, high correlations of poses between structure data can be required for accurate matching of geometric structures such as 2D matching of visual (visible by the sensors) features 710. FIG. 7 illustrates a field of view 706 of an example structure, building A, from the viewpoint of Pose A 704 and a field of view 716 of the same example structure, building A, from the viewpoint of Pose B 714. Notably, the fields of views 706 and 716 from the viewpoints of Pose A 704 and Pose B 714 show differing perspective views of the structure, building A, to be aligned or matched. The alignment/correlation points, such as the 2D field of view features 710, can be used to generate accurate matching of the visual feature 712 of the plurality of structure data. Overlapping portions of structure data between images and the correlation or matching thereof can provide alignment/correlation points for neighboring or overlapping subsets of image data or sets of image data to be connected together for map generation.

Figure 8:
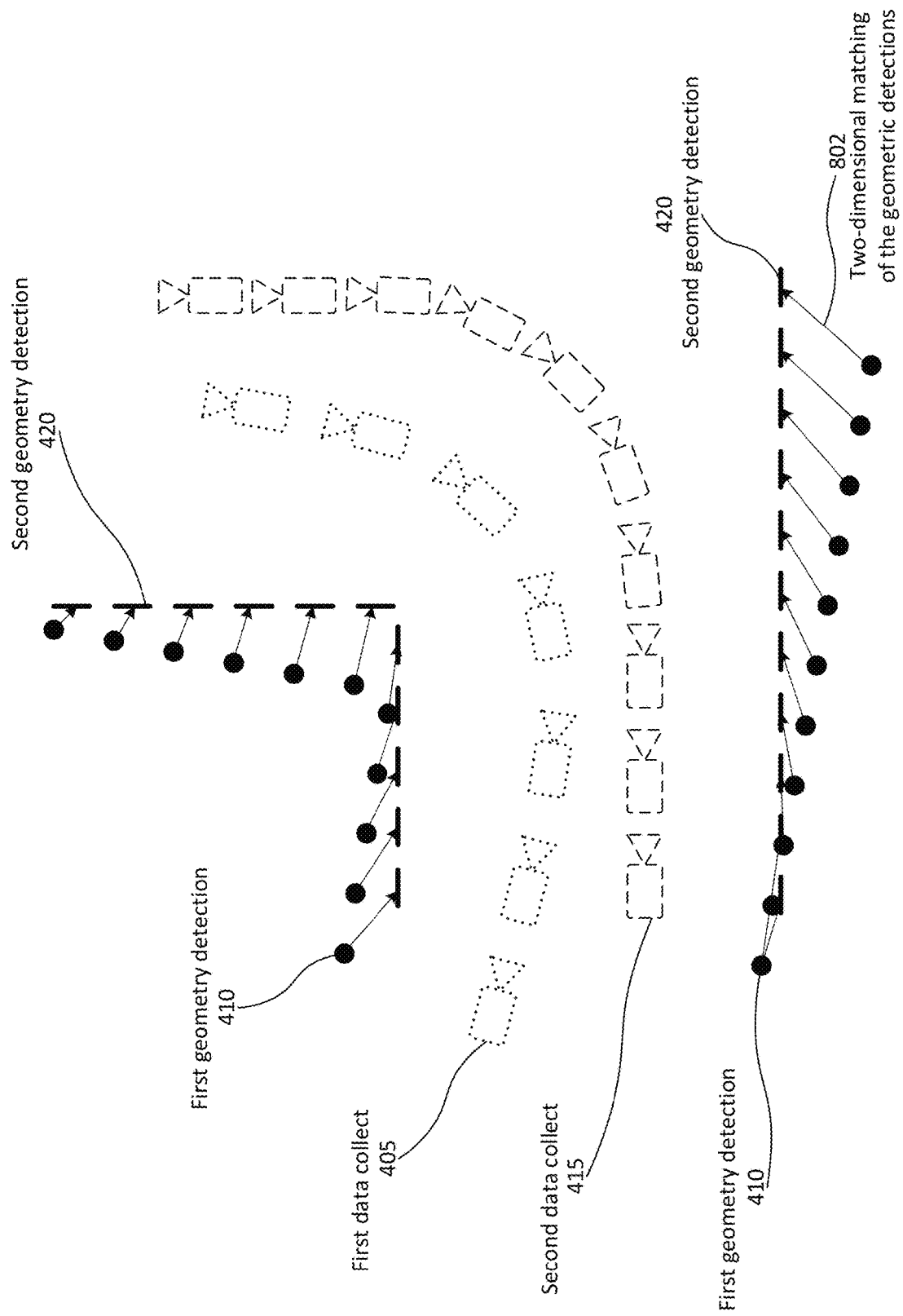
FIG. 8 shows the error margin of the geometric detections captured between the two visual data collects of FIG. 4.

FIG. 8 illustrates an example, or simplified, view of the 2D matching process of the multi-pass fusion module 350 showing 2D matches 802 between the first and second geometry detections 410 and 420. In example embodiments, based on the 2D matches 802, a transformation can be determined in order to correctly align and warp the visual and other structural features of each structure data from the first data collect 405 and the second data collect 415.

Figure 9:
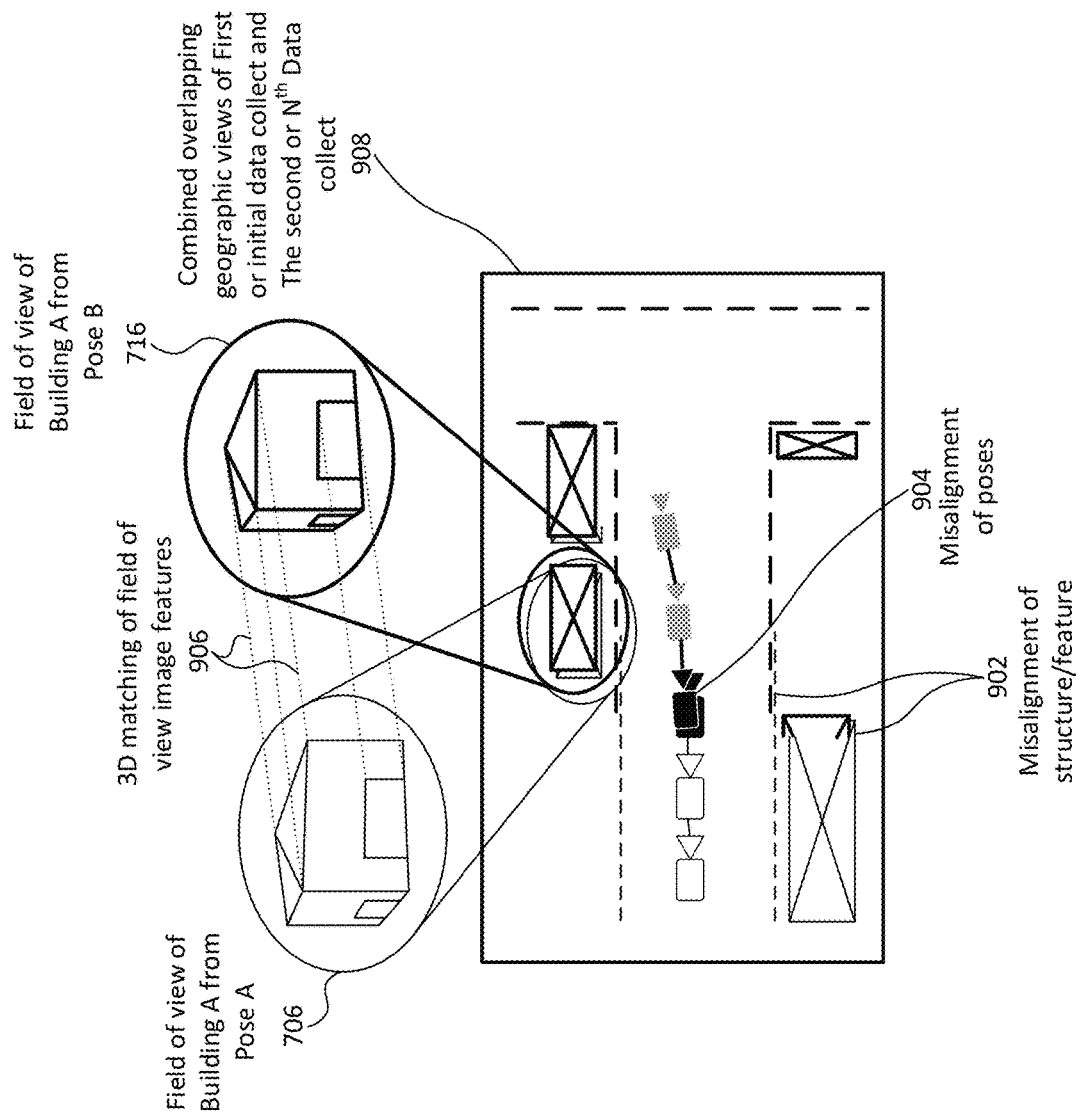
FIG. 9 illustrates the aligned and combined shared geometric detections shown in FIG. 7.

FIG. 9 illustrates the continues steps of multi-pass fusion transformation showing a combined view 908 of the first or initial structure data 606 and second or Nth structure data 608. Due to the two different trajectories, specifically due to the field of view and angle of view or pose variation, the initial and Nth structure data 606 and 608, when the structure data are combined, can show misalignment of structures or features 902 and misalignment of poses 904. As illustrated in FIG. 9, the 2D matches of visual features (visible features) 802 determined between structural data of visual map portions can be used to infer 3D matching of structure data or the field of view image features 906 (so for example, the structure data may have associated with it some visual features in the image data, such as a landmark, a building, an item of street furniture, a pedestrian sidewalk, a curb, or an edge of a visible structure—for example an edge detected using edge detection techniques). In some embodiments, matching visual features may also be used to determine one or more matching pair of images either within or between image data sets (e.g., data collects). In example embodiments, the misalignments and inaccuracies of geometries and other structural data, features and poses can all be transformed independently to conform with the coordinates of the first or initial structure data 606. Aligning the visual map portions can be accomplished by an optimization process and/or by using common data such as common images between sets of data to align or constrain alignment of points within each map portion together. The common data therefore also includes common visual data, or common visible features.

Figure 10:
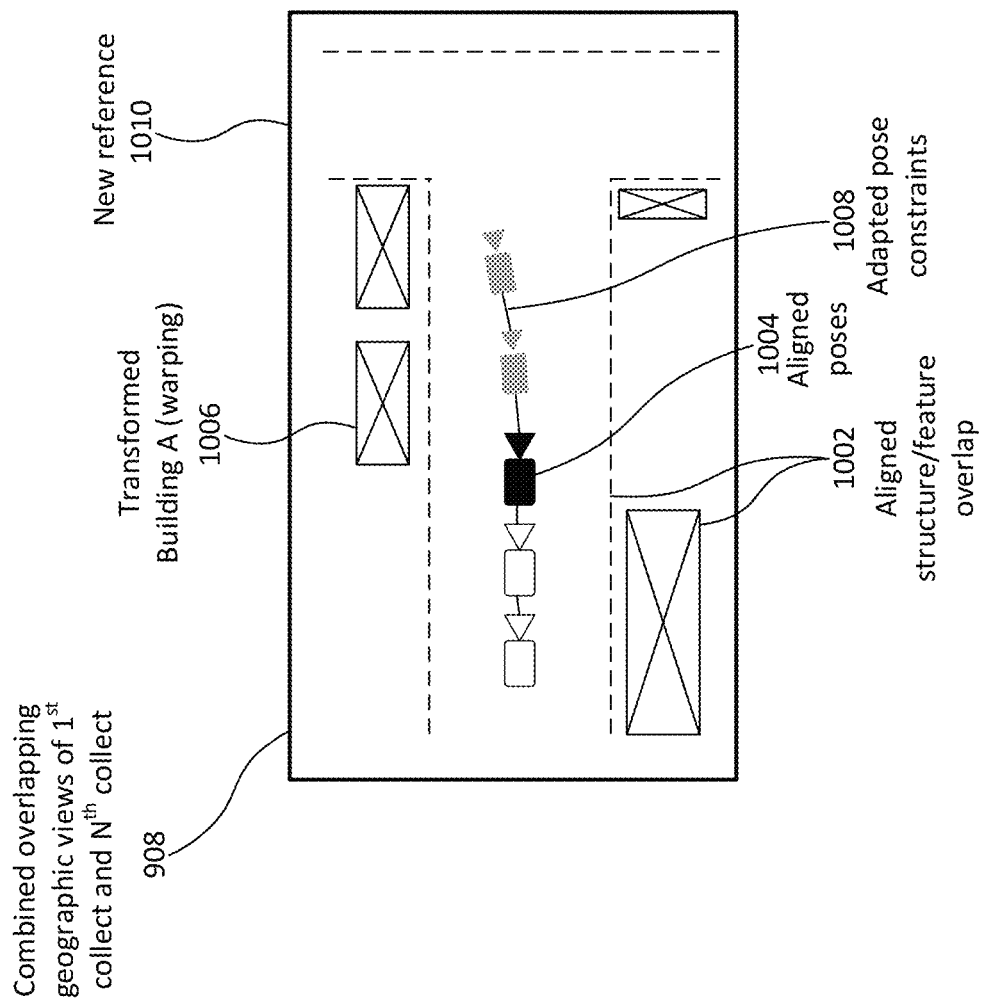
FIG. 10 illustrates the iterative nature of the described embodiment where the method receives an additional data collect with the same shared geometric detections.

FIG. 10 further illustrates the continuous multi-pass fusion process showing a transformed combination or combined overlapping geographic view of the first or initial structure data 606 and the second or Nth structure data 608. Now, the structure and features are aligned and overlap 1002, including buildings 1006 which are transformed and warped to combine the two map structures used to create the fused map structure. The poses are also aligned 1004 and as such the pose constraints are adapted 1008 to fit with the aligned poses 1004. As shown as in FIG. 10, the combined structure data can subsequently be referred to as a new reference point 1010 or "the first/initial structure data" for subsequent and continuous building of the updating of the global 3D map 270. In example embodiments the visual map portions 242, 244 can be transformed using constraints-based optimization with variables. Variables include, but is not limited to, poses of all of the images obtained by each mapping vehicle, and constraint include, but is not limited to, poses of images within each of the map segments and the relative pose of images within each of the map portions. In this way, the structures and visual features, such as building A, and can be transformed into a warped view of building A 1006.

Figure 11:
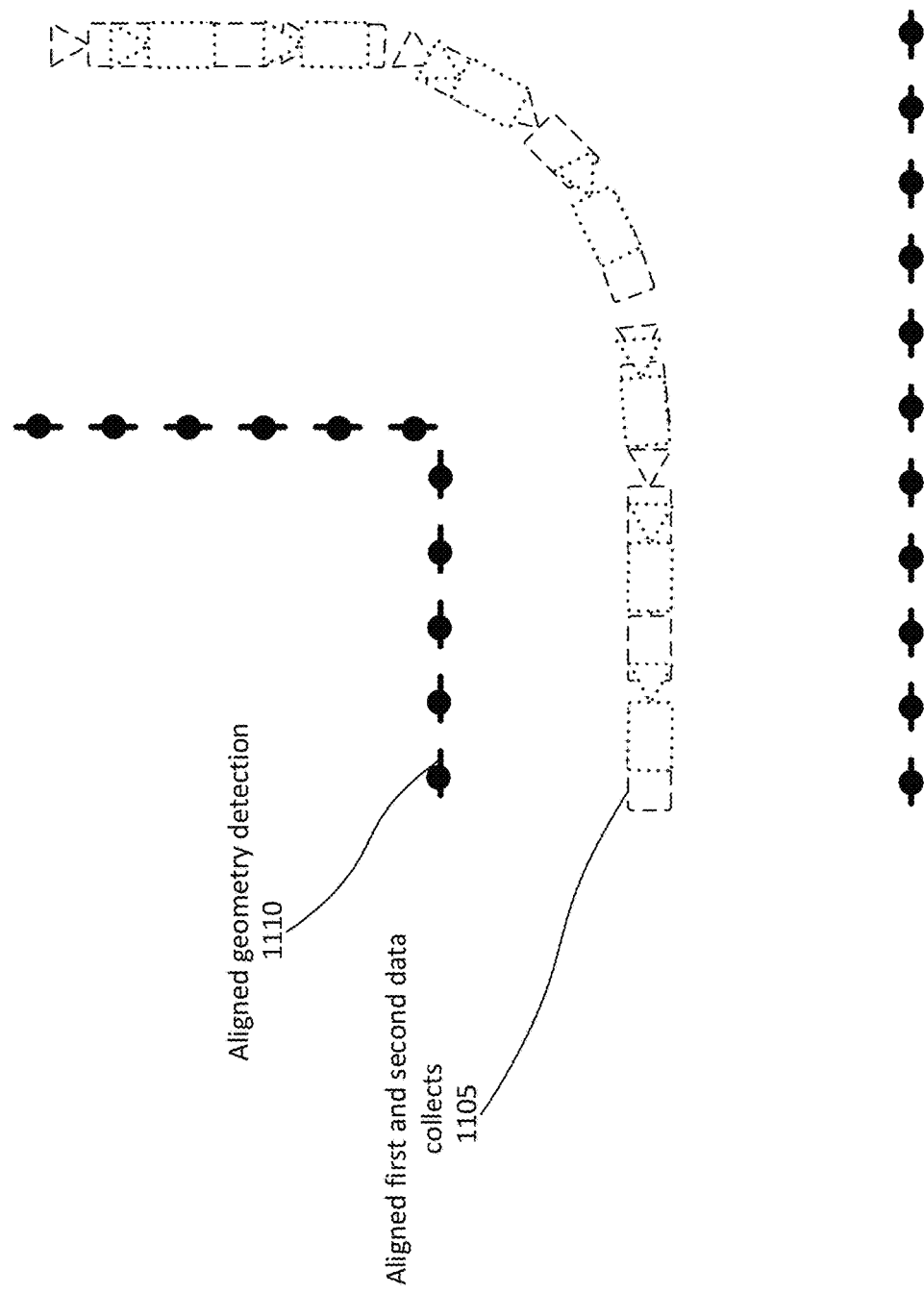
FIG. 11 shows the correctly aligned and combined map of FIG. 6.

FIG. 11 illustrates an example, or simplified, view of the aligned geometric detections 1110 and first and second data collects 1105. In example embodiments, based on the 2D matches 802, and the inferred 3D matches, a transformation has been determined in order to correctly align and warp the visual and other structural features of each structure data from the first data collect 405 and the second data collect 415 as shown in FIGS. 4 and 8.

The map generation approach using multi-collect fusion module 350 addresses the problems which arise due to broken map data and outliers which can be deemed unsuitable as part of the global map for various reasons such as data error. Such problems are difficult to detect using current methods as these problems tend to arise towards the end of the map generation pipeline. In some embodiments, as part of an optimization process, optionally as part of optimization 360 mentioned above, accuracy-increasing, or adjustment techniques may be implemented such as bundle-adjustment or pose graph optimization of the global map. Thus, in some embodiments, optimization techniques can be used to generate a more robust and accurate map. For further optimization, operations may be ordered to run in order of ascending computational complexity, such that computationally cheaper operations can be used to filter out subsets that are too dissimilar first, in order to avoid the unnecessary intense computation.

Conditions change constantly, even for the same paths taken by multiple vehicles. For example, a vehicle obtaining image data may be following a larger vehicle that is blocking its view. In such scenarios, the imaging device cannot obtain image data to be used to reconstruct a robust map due to the occlusion. Thus, in order to overcome such situations, in some embodiments the multi-collect fusion module 350 may further run a sparse matching algorithm to filter out such image data thus only include substantially reliable image data for the alignment phase.

Furthermore, many variations to the example embodiments are possible. It should be appreciated that there can be additional, fewer, or alternative steps performed in similar or alternative orders, or in parallel, within the scope of the various embodiments discussed herein unless otherwise stated.

It is particularly important for scalable methods to be available to process image data and generate maps, such as for maps deployed in the cloud used for visual localization (and for developments of further applications such as trajectory simulations for autonomous vehicles, urban planning, and augmented reality for example).

The capability for a device to determine with a high degree of precision where the device is located within a 3D space, for example with precision within a centimeter, is likely to be pivotal for many robotics, augmented, and virtual reality applications or autonomous vehicles. For example, this level of precision can allow vehicles to operate safely and efficiently navigate its environment accurately. This level of precision cannot be achieved with current satellite global position technologies (e.g., GPS) for various reasons, including for example due to the challenging environmental conditions experienced in at least some if not most locations (atmospheric effects, the reflection of waves in urban environments, sky visibility etc.). In particular, satellite position within buildings and dense urban environments is typically very imprecise.

Moreover, for localization functionality with the above-mentioned level of precision to be useful in robotics and augmented reality applications, it must be sufficiently robust. For it to be sufficiently robust such localization should work persistently, in all weather conditions, in changing environments, both indoors and outdoors, at city-level scale, and in real-time.

Figure 12:
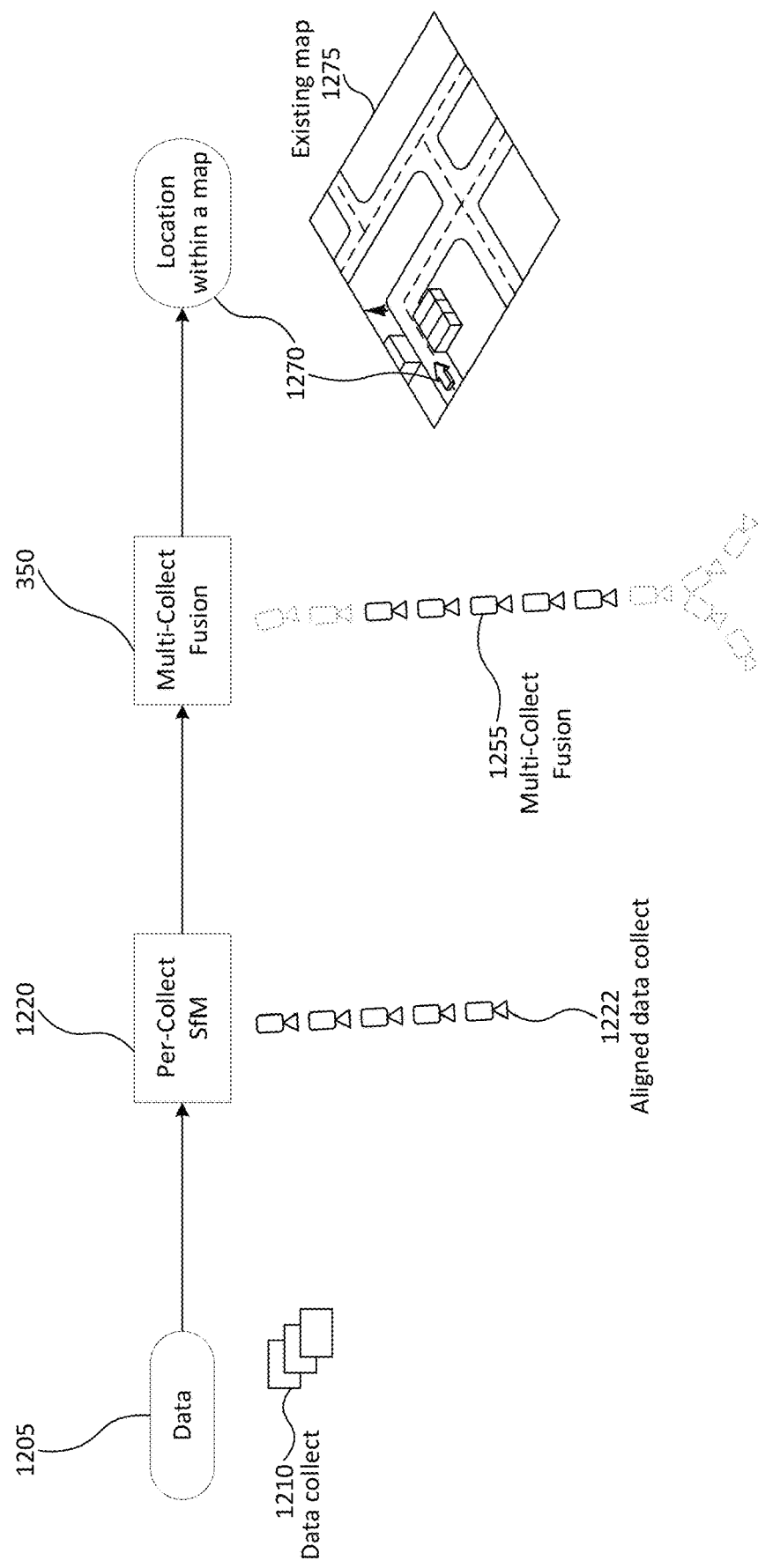
FIG. 12 illustrates an application of the described embodiment, more specifically focusing on localization of sensors or devices.

With reference to FIG. 12, an application of a pipeline that incorporates multi-collect fusion will now be described, specifically for localization of devices. In an example embodiment of device localization, an existing map 1275 and its global coordinate frame can be used. In example embodiments, it is sought to implement the teachings of multi-collect fusion above. As illustrated in FIG. 12, new image data 1205 may be collected by the device to be localized. The new data 1205 comprises data collects 1210 of a local map portion obtained by the trajectory of the moving device, which is processed using per-collect SfM 1220 in order to extract structural and pose data from the data collects 1210. This step generate a local map of the environment using the images obtained, as previously described in relation to the multi-collection fusion map generation process above. As per the multi-collection fusion map generation process above, the multi-pass fusion process 350 determines a transformation between the structure data of the local map and the structure data of the existing map but no fusion of the structure data of the local map and the structure data of the existing map is performed—instead the transformation that is determined allows the structure data of the local map to be localized within the existing map based on where the transformation determines the local map fits within the existing map 1255. To assist with the process, an optional initial localization step can be performed by using satellite triangulation data to obtain an initial position of the local map within the existing map.

In example embodiments, the misalignments and inaccuracies of geometries of the new local map structure data and its visual features and poses can all be transformed independently to conform with the coordinates of the existing map 1275. Aligning and connecting and/or fusing the new visual map portion to be localized can be accomplished by an optimization process and/or by using common data such as common images between sets of data to align or constrain alignment of points within each map portion together. In example embodiments the new visual map portion, or local map portion, can be transformed using constraints-based optimization with variables. Variables include, but is not limited to, poses of all of the images obtained by each mapping vehicle, and constraint include, but is not limited to, poses of images within each of the map segments and the relative pose of images within each of the map portions. In this way, both local and remote resources can be used to provide substantially real time of a device. Specifically, the location 1270 of the device can be determined within the global coordinate system based on the local map portion's transformation onto the existing map 1275. In embodiments, when localizing devices using the multi-pass fusion technique, the new data (for example, data 1205) is used to as a reference to localize the device only, not to update or add to the existing map (e.g., the global map). In example embodiments, the existing or global map is not associated with a particular reference device, vehicle, sensor or collect, but instead is a global reference with a variety of collects, samples, sensor input data, map types or map segments from a plurality and/or variety of devices, vehicles, robots or sensors obtained at different times, places and environmental conditions which may be continuously updated. In this context, the structure data of a local map can be transformed onto the structure data of a global map.

In example embodiments, the global map is not associated with a particular reference device, vehicle, robot, sensor or collect, but instead is a global reference with a variety of collects, samples, sensor input data or map segments from a plurality and/or variety of devices, vehicles, robots or sensors obtained at different times, places and environmental conditions, which may be continuously updated.

Image data obtained for processing by at least one image sensor attached to a vehicle, in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression. Optionally, further features or "metadata" that can be used for associating image data for map generation include, however is not limited to, GPS data, Inertial Measurement Unit (IMU) data, environmental data, semantic data and timestamp measurements. Building the sets of image data can take into account some or all of this metadata or that metadata which is available for the images.

In particular embodiments, the imaging device may include one or more processors (e.g., CPU, GPU), memory, and storage. An operating system and applications may be installed on the user device, such as, e.g., a map-based application associated with various modules as disclosed herein, applications associated with third-party systems, and applications associated with the operating system. The imaging device may include functionality for determining its location, direction, or orientation, based on integrated sensors such as GPS, compass, gyroscope, or accelerometer. The device may also include wireless transceivers for wireless communication and may support wireless communication protocols such as Bluetooth, near-field communication (NFC), infrared (IR) communication, and WI-FI. The device may also include one or more cameras, scanners, touchscreens, microphones, speakers, and any other suitable input-output devices.

Sequential image data may be further defined as a sequence of image frames, captured over a period of time as a vehicle moves within an environment. In example embodiments, sequential image data may further be defined as an orderly set of image frames, ordered by image frames with respect to time, location, and/or enlargement or diminution of a particular scene or part of a scene observed by the imaging device. In some embodiments, each image frame may also be provided to the system with its corresponding location data for example GPS coordinates of an image frame or a group of image frames which may be used to group image data together. Sequential image data is typically segmented into approximately thirty frames per subset of image data; however, embodiments described herein may be capable of processing varying sizes of image data subsets and it can also be possible to process a varying number of image frames. Thirty image frames can be seen as an example subset size as typical paths of vehicles can be misunderstood if subset sizes are too small and may lead to confusion or duplication in categorizing subsets as straight or turns if subset sizes are too large.

The vehicle can be autonomous, semi-autonomous, or manually drivable. As an example, and not by way of limitation, the network environment may include multiple vehicles, third-party systems, and networks. In particular embodiments, the vehicle may be equipped with an array of sensors and a navigation system. In particular embodiments, a fleet of vehicles may be managed by management system. The fleet of vehicles, in whole or in part, may be owned by the entity associated with the transportation management system, or they may be owned by a third-party entity relative to the transportation management system. In either case, the transportation management system may control the operations of the vehicles.

In particular embodiments, the vehicles may receive data from and transmit data to the global server system and third-party systems. Examples of received data may include, e.g., instructions, new software or software updates, maps, 1D models, trained or untrained machine-learning models, location information, the vehicle itself, other vehicles, and target destinations, navigation information, traffic information, weather information, and any other suitable information. Examples of data transmitted from the vehicle may include, e.g., telemetry and sensor data, determinations/decisions based on such data, location, navigation data, and any other suitable data.

In particular embodiments, a vehicle may obtain and process sensor/telemetry data. Such data may be captured by any suitable sensors. For example, the vehicle may have a LiDAR sensor array of multiple LiDAR transceivers that are configured to rotate 360°, emitting pulsed laser light and measuring the reflected light from objects surrounding vehicle. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary.

As another example, the vehicle may have optical cameras pointing in different directions. The cameras may be used for, e.g., recognizing roads, lane markings, street signs, traffic lights, police, other vehicles, and any other visible objects of interest. To enable the vehicle to "see" at night, infrared cameras may be installed. In particular embodiments, the vehicle may be equipped with stereo vision for, e.g., spotting hazards such as pedestrians or tree branches on the road. As another example, the vehicle may have radars for, e.g., detecting other vehicles and hazards afar. Furthermore, the vehicle may have ultrasound equipment for, e.g., parking and obstacle detection. In addition to sensors enabling the vehicle to detect, measure, and understand the external world around it, the vehicle may further be equipped with sensors for detecting and self-diagnosing the vehicle's own state and condition. For example, the vehicle may have wheel sensors for, e.g., measuring velocity; GPS for, e.g., determining the vehicle's current geolocation; and inertial measurement units, accelerometers, gyroscopes, and odometer systems for movement or motion detection.

In particular embodiments, the vehicle may be equipped with a processing unit (e.g., one or more CPUs and GPUs), memory, and storage. The vehicle may thus be equipped to perform a variety of computational and processing tasks, including processing the sensor data, extracting useful information, and operating accordingly. For example, based on images captured by its cameras and a machine-vision model, the vehicle may identify particular types of objects captured by the images, such as pedestrians, other vehicles, lanes, curbs, and any other objects of interest.

In particular embodiments, the vehicle may have a navigation system responsible for safely navigating the vehicle. In particular embodiments, the navigation system may take as input any type of sensor data from, e.g., a GPS module, IMU, LiDAR sensors, optical cameras, radio frequency (RF) transceivers, or any other suitable telemetry or sensory mechanisms. The navigation system may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system may use its determinations to control the vehicle to operate in prescribed manners and to guide the vehicle to its destinations without colliding into other objects. Although the physical embodiment of the navigation system (e.g., the processing unit) appears in a particular location on the vehicle, navigation system may be located in any suitable location in or on the vehicle. Example locations for navigation system include inside the cabin or passenger compartment of the vehicle, near the engine/battery, near the front seats, rear seats, or in any other suitable location.

Figure 13:
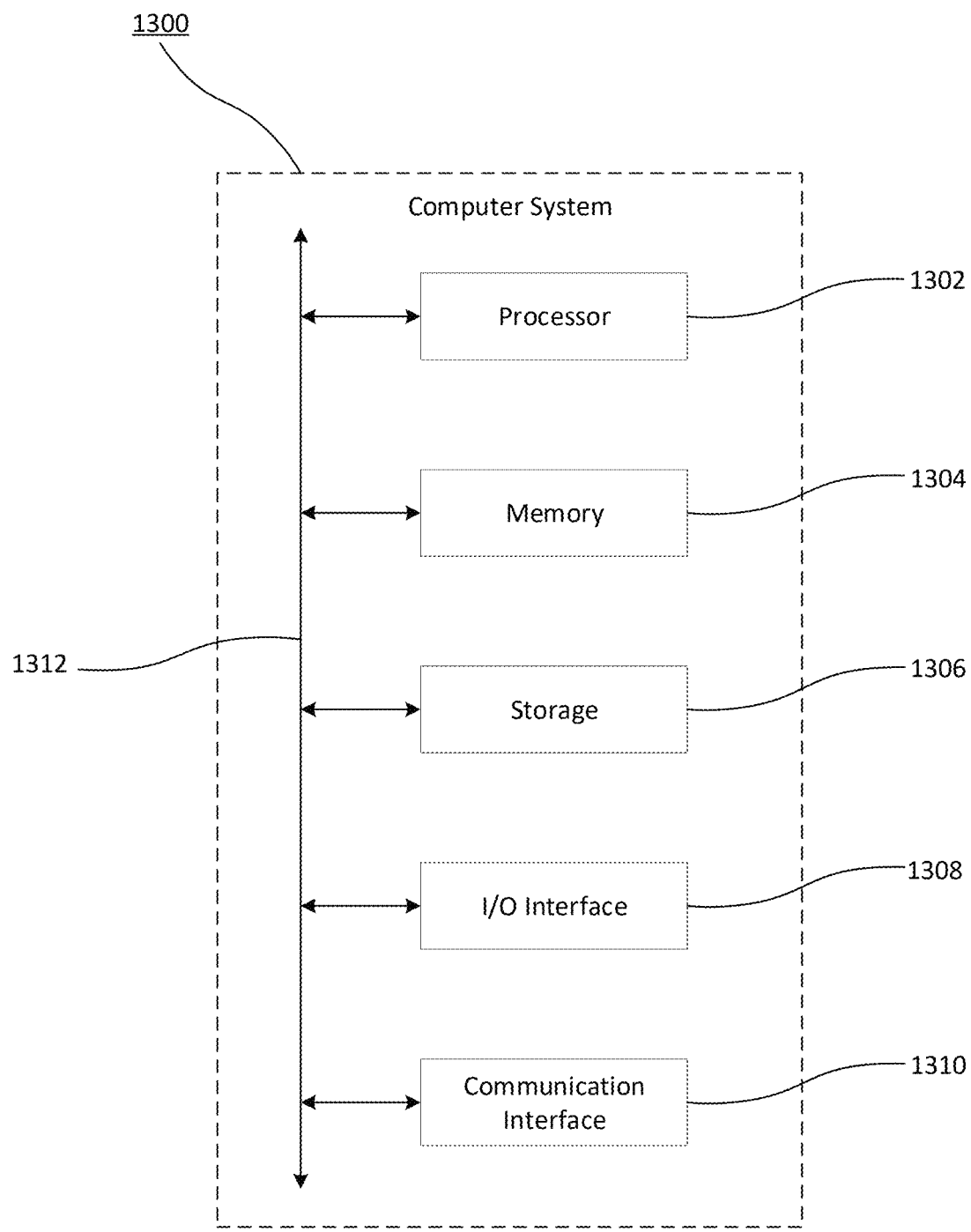
FIG. 13 shows an illustration of an example computer system for use with described embodiments.

With reference to FIG. 13, an example computer system 1300 will now be described. In particular embodiments, the example computer system 1300 may be configured to perform one or more functions of one or more methods described or illustrated herein either alone or in combination with one or more other computer systems (which may take a similar form to computer system 1300). In particular embodiments, software running on the example computer system 1300 may enable computer system 1300 to perform one or more functions of one or more methods described or illustrated herein. Herein, a reference to a computer system may encompass a computing device, and vice versa, where appropriate. Moreover, a reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems may one or more functions of one or more methods described or illustrated herein perform without substantial spatial or temporal limitation. As an example, and not by way of limitation, one or more computer systems may perform in real time or in batch mode one or more functions of one or more methods described or illustrated herein. One or more computer systems may perform one or more functions of one or more methods described or illustrated herein at different times or at different locations, where appropriate.

In particular embodiments, computer system 1300 includes at least one processor 1302, non-transitory computer readable media such as memory 1304 and storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing program instructions, including but not limited to program instructions for carrying out one or more functions of one or more of the methods described or illustrated herein. As an example and not by way of limitation, to execute program instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example, and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 that are to be operated on by computer instructions; the results of previous instructions executed by processor 1302 that are accessible to subsequent instructions or for writing to memory 1304 or storage 1306; or any other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs), be a multi-core processor, or may include multiple processing units. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example, and not by way of limitation, computer system 1300 may load instructions from storage 1306 or another source (such as another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described in further detail below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may also include multiple memory units, where appropriate. Although this disclosure describes and illustrates particular memory, this disclosure contemplates any suitable memory.

In particular embodiments, storage 1306 includes storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may also include multiple storage units. Although this disclosure describes and illustrates particular storage, this disclosure contemplates any suitable storage.

In particular embodiments, I/O interface 1308 includes hardware or software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include also include multiple I/O interface units, where appropriate. Although this disclosure describes and illustrates a particular I/O interface, this disclosure contemplates any suitable I/O interface.

In particular embodiments, communication interface 1310 includes hardware or software, or both providing one or more interfaces for communication (such as, for example, packet-based communication) between computer system 1300 and one or more other computer systems (or other network devices) via one or more networks. As an example and not by way of limitation, communication interface 1310 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1300 may include any suitable communication interface 1310 for any of these networks, where appropriate. Communication interface 1310 may also include multiple communication interface units, where appropriate. Although this disclosure describes and illustrates a particular communication interface, this disclosure contemplates any suitable communication interface.

In particular embodiments, bus 1312 includes hardware or software, or both coupling components of computer system 1300 to each other. As an example and not by way of limitation, bus 1312 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may also include multiple bus units, where appropriate. Although this disclosure describes and illustrates a particular bus, this disclosure contemplates any suitable bus or interconnect.

The computing entities may be communicatively connected over any suitable network. As an example and not by way of limitation, one or more portions of network may include an ad hoc network, an extranet, a virtual private network (VPN), a LAN, a wireless LAN (WLAN), WAN, a wireless WAN (WWAN), a MAN, a portion of the Internet, or a combination of any of the above. In particular embodiments, any suitable network arrangement and protocol enabling the computing entities to communicate with each other may be used. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof.

Example embodiments may include one or more server computers. Each server may be a unitary server or a distributed server spanning multiple computers or multiple data centers. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server.

Example embodiments may include one or more data stores. The data stores may be used to store various types of information, historical information, third-party information, or any other suitable type of information. In particular embodiments, the information stored in the data stores may be organized according to specific data structures. In some embodiments, each data store may be a relational, columnar, correlation, or any other suitable type of database system. Although this disclosure describes or illustrates particular types of databases, this disclosure contemplates any suitable types of databases. Some embodiments may further provide interfaces that enable a user to process, transform, manage, retrieve, modify, add, or delete the information stored in the data store.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more functions of the methods described herein, where appropriate. Although this disclosure describes and illustrates particular functions of certain methods as occurring in a particular order, this disclosure contemplates any suitable functions of the methods occurring in any suitable order or in any combination which may include all, some, or none of the functions of the methods. Furthermore, although this disclosure may describe and illustrate particular components, devices, or systems carrying out particular functions of a method, this disclosure contemplates any suitable combination of any suitable components, devices, or systems carrying out any suitable functions of the method. It should be appreciated that there can be additional, fewer, or alternative functions performed in similar or alternative orders, or in parallel, within the scope of the various embodiments discussed herein unless otherwise stated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:

1. A computer-implemented method comprising:
generating a local map portion of a geographical environment based on sensor data captured by a device, wherein the sensor data comprises digital image data and the local map portion comprises local map structure data generated by processing the captured digital image data using a technique for determining structure from a first series of images within the captured digital image data, and wherein the local map structure data comprises (i) a first three-dimensional (3D) representation of the geographical environment that is generated during the processing of the captured digital image data using the technique for determining structure from the first series of images and (ii) first sequential pose data associated with the first series of images that is generated during the processing of the captured digital image data using the technique for determining structure from the first series of images;
accessing existing map structure data of an existing map, wherein the existing map structure data is aligned to a global coordinate system and is predetermined from map structure data that was previously generated by processing previously-captured digital image data using a technique for determining structure from a second series of images within the previously-captured digital image data, and wherein the existing map structure data comprises (i) a second 3D representation of the geographic environment that is generated during the processing of the previously-captured digital image data using the technique for determining structure from the second series of images and (ii) second sequential pose data associated with the second series of images that is generated during the processing of the previously-captured digital image data using the technique for determining structure from the second series of images;
identifying pose correlations between (i) poses included in the first sequential pose data that is generated during the processing of the captured digital image data using the technique for determining structure from the first series of images and (ii) poses included in the second sequential pose data that is generated during the processing of the previously-captured digital image data using the technique for determining structure from the second series of images;
identifying feature correlations between (i) visible features included in the first 3D representation environment that is generated during the processing of the captured digital image data using the technique for determining structure from the first series of images and (ii) visible features included in the second 3D representation that is generated during the processing of the previously-captured digital image data using the technique for determining structure from the second series of images;
determining a transformation of the local map portion relative to the existing map based on the identified pose correlations and the identified feature correlations; and
determining a localization of the device within the global coordinate system by using the determined transformation to align the local map portion with the existing map.

2. The computer-implemented method of claim 1, wherein using the determined transformation to align the local map structure data with the existing map comprises manipulating the local map structure data by one or more of (i) seven degrees of freedom, (ii) rotation, (iii) dilation, (iv) contraction (v) reflection, (vi) scaling, or (vii) shear mapping operations.

3. The computer-implemented method of claim 1, further comprising:
determining a matching pair of images based on the identified feature correlations between the visible features included in the first 3D representation and the visible features included in the second 3D representation, wherein the matching pair of images comprises one image from the first series and one image from second series.

4. The computer-implemented method of claim 1, wherein identifying the feature correlations between the visible features included in the first 3D representation and the visible features included in the second 3D representation comprises:
   identifying the feature correlations between the visible features included in the first 3D representation and the visible features included in the second 3D representation using one or more of a visual feature matching technique or an edge detection technique.

5. The computer-implemented method of claim 1, wherein identifying the feature correlations between the visible features included in the first 3D representation and the visible features included in the second 3D representation comprises:
   detecting one or more two-dimensional (2D) visible features in each of the first series of images and each of the second series of images;
   identifying feature correlations between 2D visible features detected in the first series of images and 2D visible features detected in the second series of images; and
   using the identified feature correlations between the 2D visible features detected in the first series of images and 2D visible features detected in the second series of images as a basis for identifying the feature correlations between the visible features included in the first 3D representation and the visible features included in the second 3D representation.

6. The computer-implemented method of claim 1, wherein determining the localization of the device within the global coordinate system comprises:
   performing a pose comparison between the local map portion and the existing map.

7. The computer-implemented method of claim 1, wherein the visible features included in the first 3D representation and the visible features included in the second 3D representation each comprise one or more of (i) a landmark, (ii) a building, (iii) a street furniture, (iv) a pedestrian sidewalk, (v) a curb, or (vi) a corner or an edge of a visible structure.

8. The computer-implemented method of claim 1, wherein determining the transformation of the local map structure data relative to the existing map based on the identified pose correlations and the identified feature correlations further comprises:
   determining the transformation by applying a constraint-based optimization process that uses the identified pose correlations as pose constraints.

9. The computer-implemented method of claim 1, wherein the technique for determining structure from the first series of images within the digital image data and the technique for determining structure from the second series of images comprise structure from motion techniques.

10. The computer-implemented method of claim 1, further comprising:
    performing an initial localization within the global coordinate system to identify the existing map structure data of the existing map, wherein the initial localization comprises using satellite navigation.

11. The computer-implemented method of claim 1, wherein using the determined transformation to align the local map portion with the existing map further comprises:
    using the determined transformation to warp the local map portion in order to align it with the existing map.

12. The computer-implemented method of claim 1, wherein identifying the pose correlations between the poses included in the first sequential pose data and the poses included in the second sequential pose data comprises:
    based one or more of location similarities, directional similarities, or visual similarities, determining overlapping poses between (i) the first sequential pose data and (ii) the second sequential pose data.

13. A non-transitory computer-readable medium comprising program instructions stored thereon that, when executed by at least one processor of a computing system, cause the computing system to perform functions comprising:
    generating a local map portion of a geographical environment based on sensor data captured by a device, wherein the sensor data comprises digital image data and the local map portion comprises local map structure data generated by processing the captured digital image data using a technique for determining structure from a first series of images within the captured digital image data, and wherein the local map structure data comprises (i) a first three-dimensional (3D) representation of the geographical environment that is generated during the processing of the captured digital image data using the technique for determining structure from the first series of images and (ii) first sequential pose data associated with the first series of images that is generated during the processing of the captured digital image data using the technique for determining structure from the first series of images;
    accessing existing map structure data of an existing map, wherein the existing map structure data is aligned to a global coordinate system and is predetermined from map structure data that was previously generated by processing previously-captured digital image data using a technique for determining structure from a second series of images within the previously-captured digital image data, and wherein the existing map structure data comprises (i) a second 3D representation of the geographic environment that is generated during the processing of the previously-captured digital image data using the technique for determining structure from the second series of images and (ii) second sequential pose data associated with the second series of images that is generated during the processing of the previously-captured digital image data using the technique for determining structure from the second series of images;
    identifying pose correlations between (i) poses included in the first sequential pose data that is generated during the processing of the captured digital image data using the technique for determining structure from the first series of images and (ii) poses included in the second sequential pose data that is generated during the processing of the previously-captured digital image data using the technique for determining structure from the second series of images;
    identifying feature correlations between (i) visible features included in the first 3D representation environment that is generated during the processing of the captured digital image data using the technique for determining structure from the first series of images and (ii) visible features included in the second 3D representation that is generated during the processing of the previously-captured digital image data using the technique for determining structure from the second series of images;
determining a transformation of the local map portion relative to the existing map based on the identified pose correlations and the identified feature correlations; and
determining a localization of the device within the global coordinate system by using the determined transformation to align the local map portion with the existing map.

14. The non-transitory computer-readable medium of claim 13, further comprising program instructions stored thereon that, when executed by the at least one processor of the computing system, cause the computing system to perform a function of:
determining a matching pair of images based on the identified feature correlations between the visible features included in the first 3D representation and the visible features included in the second 3D representation, wherein the matching pair of images comprises one image from the first series and one image from second series.

15. The non-transitory computer-readable medium of claim 13, wherein identifying the feature correlations between the visible features included in the first 3D representation and the visible features included in the second 3D representation comprises:
detecting one or more two-dimensional (2D) visible features in each of the first series of images and each of the second series of images;
identifying feature correlations between 2D visible features detected in the first series of images and 2D visible features detected in the second series of images; and
using the identified feature correlations between the 2D visible features detected in the first series of images and 2D visible features detected in the second series of images as a basis for identifying the feature correlations between the visible features included in the first 3D representation and the visible features included in the second 3D representation.

16. The non-transitory computer-readable medium of claim 13, wherein determining the localization of the device within the global coordinate system comprises:
performing a pose comparison between the local map portion and the existing map.

17. A computing system comprising:
at least one processor;
a non-transitory computer-readable medium; and
program instructions stored on the non-transitory computer-readable medium that are executable by the at least one processor such that the computing system is configured to perform functions comprising:
generating a local map portion of a geographical environment based on sensor data captured by a device, wherein the sensor data comprises digital image data and the local map portion comprises local map structure data generated by processing the captured digital image data using a technique for determining structure from a first series of images within the captured digital image data, and wherein the local map structure data comprises (i) a first three-dimensional (3D) representation of the geographical environment that is generated during the processing of the captured digital image data using the technique for determining structure from the first series of images and (ii) first sequential pose data associated with the first series of images that is generated during the processing of the captured digital image data using the technique for determining structure from the first series of images;
accessing existing map structure data of an existing map, wherein the existing map structure data is aligned to a global coordinate system and is predetermined from map structure data that was previously generated by processing previously-captured digital image data using a technique for determining structure from a second series of images within the previously-captured digital image data, and wherein the existing map structure data comprises (i) a second 3D representation of the geographic environment that is generated during the processing of the previously-captured digital image data using the technique for determining structure from the second series of images and (ii) second sequential pose data associated with the second series of images that is generated during the processing of the previously-captured digital image data using the technique for determining structure from the second series of images;
identifying pose correlations between (i) poses included in the first sequential pose data that is generated during the processing of the captured digital image data using the technique for determining structure from the first series of images and (ii) poses included in the second sequential pose data that is generated during the processing of the previously-captured digital image data using the technique for determining structure from the second series of images;
identifying feature correlations between (i) visible features included in the first 3D representation environment that is generated during the processing of the captured digital image data using the technique for determining structure from the first series of images and (ii) visible features included in the second 3D representation that is generated during the processing of the previously-captured digital image data using the technique for determining structure from the second series of images;
determining a transformation of the local map portion relative to the existing map based on the identified pose correlations and the identified feature correlations; and
determining a localization of the device within the global coordinate system by using the determined transformation to align the local map portion with the existing map.

18. The computing system of claim 17, further comprising program instructions stored on the non-transitory computer-readable medium that are executable by the at least one processor such that the computing system is configured to perform a function of:
determining a matching pair of images based on the identified feature correlations between the visible features included in the first 3D representation and the visible features included in the second 3D representation, wherein the matching pair of images comprises one image from the first series and one image from second series.

19. The computing system of claim 17, wherein identifying the feature correlations between the visible features included in the first 3D representation and the visible features included in the second 3D representation comprises:

detecting one or more two-dimensional (2D) visible features in each of the first series of images and each of the second series of images;

identifying feature correlations between 2D visible features detected in the first series of images and 2D visible features detected in the second series of images; and using the identified feature correlations between the 2D visible features detected in the first series of images and 2D visible features detected in the second series of images as a basis for identifying the feature correlations between the visible features included in the first 3D representation and the visible features included in the second 3D representation.

20. The computing system of claim 17, further comprising program instructions stored on the non-transitory computer-readable medium that are executable by the at least one processor such that the computing system is configured to perform a function of:

performing an initial localization within the global coordinate system to identify the existing map structure data of the existing map, wherein the initial localization comprises using satellite navigation.

\* \* \* \* \*